United States Patent [19]

Britt

[11] 4,341,303

[45] Jul. 27, 1982

[54] FRANGIBLE STRIP OF CLIPS

[75] Inventor: John P. Britt, Chelmsford, England

[73] Assignee: Pinna Corporation, Dallas, Tex.

[21] Appl. No.: 148,259

[22] Filed: May 9, 1980

Related U.S. Application Data

[62] Division of Ser. No. 957,672, Nov. 6, 1978, Pat. No. 4,215,606.

[30] Foreign Application Priority Data

Nov. 21, 1977 [GB] United Kingdom ............... 48432/77

[51] Int. Cl.[3] ...................... B65D 69/00; B65D 83/08; B65D 85/00; F16S 1/08

[52] U.S. Cl. ...................................... 206/343; 206/820

[58] Field of Search ........................ 206/343, 390, 820

[56] References Cited

U.S. PATENT DOCUMENTS

| | | | |
|---|---|---|---|
| 2,382,143 | 8/1945 | Gordon | 206/390 |
| 2,937,464 | 5/1960 | Marshall | 206/390 |
| 3,164,250 | 1/1965 | Paxton | 206/343 |
| 3,270,874 | 9/1966 | Hilton | 206/343 |
| 4,026,413 | 5/1977 | Britt et al. | 206/343 |

FOREIGN PATENT DOCUMENTS 883771 12/1961 United Kingdom .

*Primary Examiner*—William T. Dixson, Jr.

*Attorney, Agent, or Firm*—Gerald G. Crutsinger; John F. Booth; Monty L. Ross

[57] ABSTRACT

A strip 10 of slips 12 is characterized by breaking portions 62,64 at which each individual clip 12*a*, 12*b*, 12*c* is separable from its longitudinal neighbors these portions being coextensive, longitudinally of the strip, with the line of separation 60 which divides off each clip from its longitudinal neighbors and which is formed without removal of material of the strip. This line is achieved by shearing the material of the strip while bowing it about a longitudinal axis so as to present a curved surface to an oncoming shearing tool which has an oppositely curved surface. The extent of intersection of the opposite curve defines the length of the line of the separation. The breaking portion is adjacent each end of the line. The clips during severence suffer apparent lateral contraction but no longitudinal distortion.

4 Claims, 17 Drawing Figures

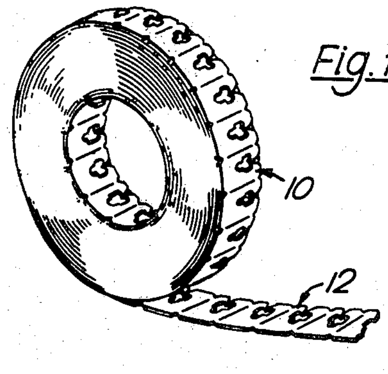
Fig. 1.
Fig. 2.
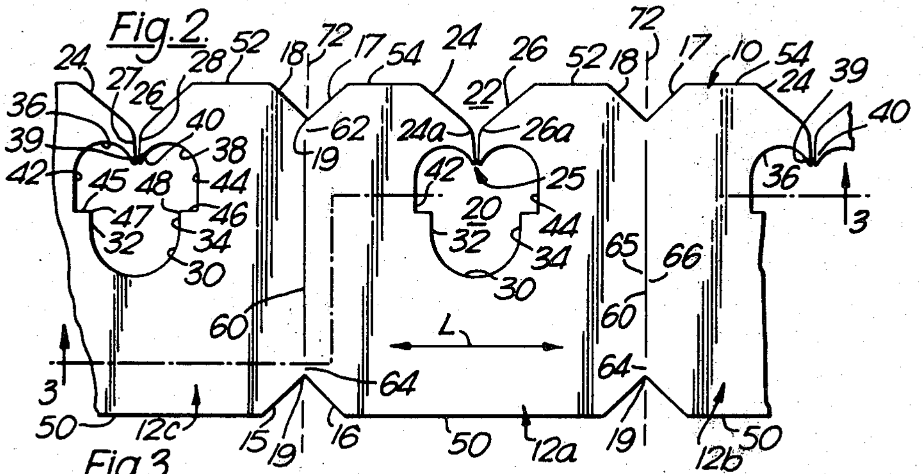
Fig. 3.
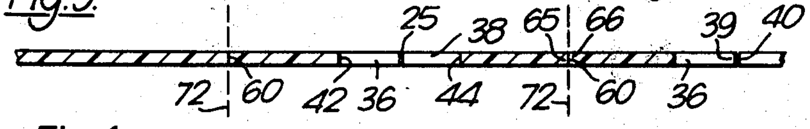
Fig. 4.
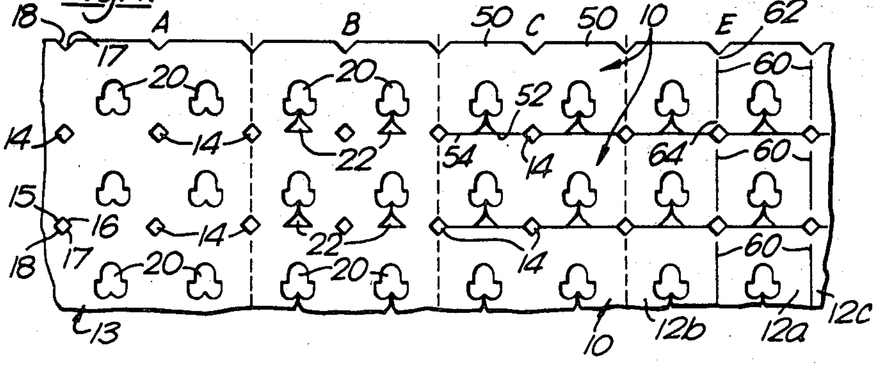

FRANGIBLE STRIP OF CLIPS

This is a division of application Ser. No. 957,672, filed Nov. 6, 1978, now U.S. Pat. No. 4,215,606.

FIELD OF THE INVENTION

The invention relates to clips for closing bags containing bread, food produce or other items as well as to methods for forming them. The clips are formed in strips, from laminar plastics material.

BACKGROUND OF THE INVENTION

It is known, for example from U.K. Pat. Nos. 1,040,535, 1,399,906 and 1,409,426 to form strips of clips of this general type and from this material.

In U.K. Pat. No. 1,040,535 material was removed from between adjacent clips in a strip so that the clips were left attached to each other by narrow frangible webs. These clips were intended to be applied to bags by apparatus of the type disclosed for example in U.K. Pat. No. 1,013,320.

Formation of the strips in this manner involves loss of material at the portions which are removed from between adjacent clips and the manner of separation of one clip from the next, which was a lateral displacement so as to break the webs at each of their ends, involves the production of stray chips of plastics (i.e. the severed webs) which can contaminate the food or other product within the bag if they should get within it, or can cause malfunction of the clip attaching mechanism. If the webs do not break in the intended fashion they can remain projecting from the edges of the clip to scratch or snag other products or hands of the users or purchasers of the bag.

Apart from the desire to avoid loss of material there are the secondary disadvantages of the presence of elongate webs (or projections) between adjacent clips. One is that if a given surface area is desired in the finished clip the starting length of the clip will be greater to allow for the wastage; thus its linear speed of progression through the manufacturing process will be higher for an eventual given output of clips per unit time. This in turn imposes an added production difficulty on ensuring accuracy in positioning, especially when punching out the aperture. Also, stretching of these elongate webs or projections before use is harmful if (as in existing machines) registration of the clip actually being filled by a bag mouth is obtained with reference to the position of a clip removed in the same strip.

The method of forming a strip of clips disclosed in U.K. Pat. No. 1,399,906 did eliminate the problem of wastage of material since a line of definition was formed, substantially without loss of material, by moving a flap of material out of the plane of material, each end of the flap defining projections extending from one clip into the next. This movement distorted the material of the strip about a lateral axis. This method of forming the line of definition involved longitudinal apparent contraction of a portion of the clip, considered in plan view, had to be carried out with great accuracy in order that the projections should be of the calculated length, and required a distinct planishing operation to restore the flap to the plane of the remainder of the strip. The clips produced still had the disadvantage the projections into the clips tended to separate from them when the clip was attached to a bag neck and removed from the strip and there was still therefore the difficulty of leaving these plastics material chips which could contaminate food or other products or of having projections projecting from the clips so as to scratch or snag the products or people. Also the flaps which form the projections, unless completely and accurately restored into the plane of the strip would tend to bias the strip into a curve and would prevent compactness in a roll of such strip.

The problem therefore remains of providing a strip of clips of this general nature which is formed without substantial loss of material in the separation of one clip from the next without the need for a distinct planishing operation, and at the same time without leaving any possibility of protrusion out of the plane of the strip or of the presence of stray chips of material resulting from separation of joining webs or projections between clips. Furthermore, the problem is also faced of the finding of a method of forming such a clip without loss of material but at the same time without involving the material in the longitudinal apparent contraction which is essential in the process of U.K. Pat. No. 1,399,906 clips and which necessarily also involves the separate planishing operation which must be completely successful unless the strips are to have ledges protruding which prevent compactness in a roll.

The process of manufacture should also not be oversensitive to variations in the quality of the material operated on and should avoid as far as possible the accumulation of debris in the tool, which latter can lead to inaccuracies (such as lack of planarity discussed above).

Problems also exist in the efficient design of the neck or passage through which the bag has to pass when it is being urged into its condition of retention by the clip, especially from the point of view of ensuring as far as possible a smooth and snag-free progress of the bag mouth into the aperture.

SUMMARY OF THE INVENTION

The invention solves the problem of avoiding the production of chips of material or of snagging projections upon the separation of clips from the strip by forming breaking portions between individual clips of the strip which are of negligible longitudinal length. That is to say, they are coextensive longitudinally of the strip with a defining line, formed by shearing the material of the strip in a line which extends laterally of it, in a shearing operation which involves substantially no loss of material. There being no loss of material it follows that the line of definition is of negligible extension longitudinally of the strip. In forming that line, and because the breaking portions do not form part of projections into or between adjacent clips having substantial length in the longitudinal direction, there is no need for the alternatives which previously had been imposed upon the operation process, that is to say neither do we have to remove material so as to form a window in the material of the strip nor do we have to form a flap which is bent out of its plane. Instead, the separation line is formed by bowing the material of the strip about a longitudinal axis and shearing it while bowed by a shearing tool having an equal and opposite curvature. The effect of this is that the strip of material is during the shearing bowed in two opposite directions and when the cause of bowing is removed these opposite bowings will be self negating so that the strip will readopt under the restorative force of its own material an essentially planar condition.

A plurality of these strips may be formed from an initial blank web of the material but the strips must be separated each from its lateral neighbour before the cutting operation is carried out which forms the line of separation of the individual clips in each strip. This is because the shearing operation as specified involves an apparent lateral contraction of each strip (as opposed to the apparent longitudinal contraction seen in the prior art process of U.K. Pat. No. 1,399,906).

In the design of the aperture, it is important to realise that the provision of the opening to the aperture in the lateral edge of the strip enables the formation of a line of definition and of breaking portions between clips of the character described above. It is a feature of the present invention that the apertures formed in the lateral edges of these strips may have a particular form which assists in the smooth introduction of the bags into the clips and of their positive retention there. The aperture is essentially clover-leafed in shape and is linked to the lateral edge of the clip by a slot having a first portion of comparatively wide angle joined by a radiussed shoulder to a narrow slot, this latter debouching into the aperture adjacent recurved edge portions of the aperture which serve as barbs. Smooth and efficient introduction of the bag as well as prevention of its escape is aided by forming the narrower portion of the slot as a slot which tapers to narrow towards the aperture but at a very low angle of taper.

DESCRIPTION OF THE DRAWINGS

Drawings of a preferred embodiment of the invention are annexed hereto so that the invention may be better and more fully understood, in which:

FIG. 1 is a perspective view of a strip of clips in a roll;

FIG. 2 is an enlarged fragmentary plan view of three clips forming a portion of a strip;

FIG. 3 is a cross-sectional view taken along line 3—3 of FIG. 2,

FIG. 4 diagrammatically illustrates the sequence in which portions of a clip are formed as a web of a material is advanced through a progressive die set;

Figure 5:
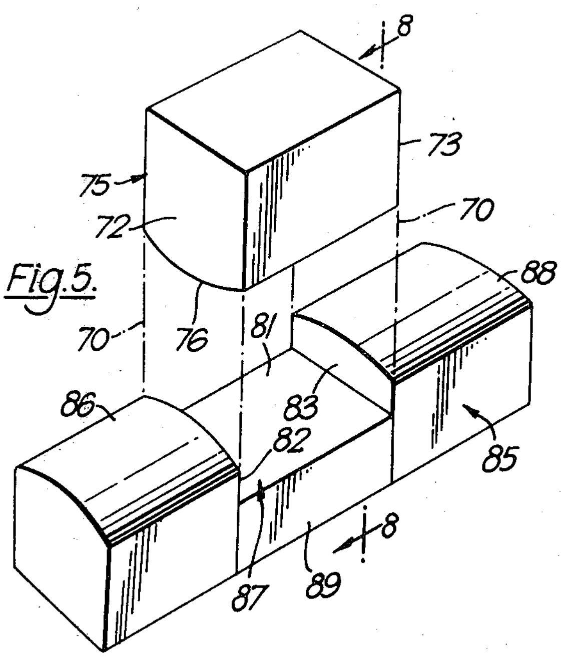
FIG. 5 diagrammatically illustrates a punch and die anvil of shear tools employed for shearing portions of a web of material in spaced shear planes to form spaced planes of fracture.

Referring first to FIGS. 1 to 3, clips 12 are joined adjacent opposite edges thereof to adjacent clips to form a strip 10, preferably rolled into a tight roll to facilitate handling and dispensing to a machine for attaching clips to necks of a bag.

Referring to FIG. 2 of the drawing, each clip 12*a*, 12*b*, and 12*c*, is of identical construction. The longitudinal direction of the strip of clips is shown by arrow L.

The details of construction of the clip illustrated in FIGS. 1 to 3 will be described in conjunction with the method of forming the clip and particularly FIG. 4 of the drawing.

As illustrated in FIG. 4 a web of a flexible plastics material such as polystyrene is moved through a five stage progressive die set for forming a plurality of strips 10 of clips 12.

At the first stage A of the five stages of constructing the clip, punches are employed for forming square diamond shaped holes 14 which will in the finished strips form notches having sides 15,16,17 and 18 at serrated edges of a strip 10 of clips 12 (FIG. 2). Simultaneously with the forming of holes 14, other punches form apertures 20 in the web 13.

At the second stage B, dies are moved through web 13 to form a bag-receiving passage 22 communicating with the central aperture 20. As best illustrated in FIG. 2, bag receiving passage 22 is bounded by converging surfaces 24 and 26 to form a tapered slot portion for directing the neck of a bag through a narrow slot portion 25 bounded on opposite sides by surfaces 27 and 28 and a radiused shoulder 24*a* 26*c* is formed as a transition between the two.

The geometrical configuration of aperture 20 is important to the proper functioning of clip 12 for securely connecting the clip to the neck of a bag. The aperture 20 comprises a semi-circular portion 30 which has a surface which tangentially intersects with straight surfaces 32 and 34. The opposite side of aperture 20 is formed by a pair of recurved surfaces 36 and 38 which intersect the side surfaces 27 and 28 of the slot 25 where the latter debauches into the aperture to form pointed barb-like projections 39 and 40. Curved surfaces 36 and 38 also tangentially intersect with straight surfaces 42 and 44 intersecting at approximately right angles with ledge surfaces 45 and 46. It should be appreciated that surfaces 32, 34, 42, and 44 are substantially parallel to each other and are perpendicular to surfaces 45 and 46. Thus, right angle projections 47 and 48 are formed which as will be explained later have a function in gripping a bag mouth when held in the aperture.

Progressing to the third stage C, the web 13 is cut along its longitudinal direction to define what will be a rear surface 50 and front surfaces 52 and 54 on each clip and to sever the web 13 so as to form a plurality of strips 10 of clips 12. To avoid longitudinal contraction the cutting operation is carried out by a longitudinally channeled punch working into a longitudinally extending channel die, with shear between the oncoming sharpened parallel edges of the punch and the walls of the die. There is a spring-loaded stripper to return the material to above the mouth of the die when the punch is withdrawn. At a fourth stage no positive action is performed on the web 13. The fourth stage is provided to physically space the fifth stage E from the third stage C as diagrammatically illustrated in FIG. 4.

At the fifth stage E a pair of parallel transverse lines 60 is sheared in each strip 10 in accordance with the method which will be hereinafter more fully explained.

Referring to FIGS. 2 and 3 of the drawing, it will be appreciated that each of the transverse cuts 60 terminates inwardly of the apices 19 formed at the intersection of converging surfaces 15 and 16 and converging surfaces 17 and 18, respectively. Thus, portions 62 and 64 of strip 10 adjacent opposite ends of cut 60 are not severed and form breaking portions integral with each of the adjacent clips for breakably connecting adjacent clips.

Experiments reveal that application of force to breaking portions 62 and 64 of strip 10 results in fracture of the area between apex 19 and ends of cut 60 because the breaking portions are longitudinally extensive with the line 60 when portions 62 and 64 of the web are fractured, no residual chips are formed which might contaminate food products or cause malfunction of a clip feeding mechanism.

As will be hereinafter more fully explained, in forming the line 60, edges 65 and 66 of clip 12 adjacent opposite sides of cut 60 are moved in a shear plane 70 which corresponds to a plane of fracture 72 extending laterally of the strip between adjacent clips, the breaking portions 62 and 64 of strip 10 being in the plane of fracture 72. That is, in forming individual clips 12 at stage E the material of web 13 is severed in the shear plane. When a clip 12*b* is removed from an adjacent clip 12*a*, the portions 62 and 64 are fractured in the plane of fracture 72 such that each clip has smooth edges which do not scratch or snag surfaces which they may contact.

Referring more specifically to FIGS. 5 to 14, FIG. 5 shows diagrammatically a punch 75. This has a curved downwardly convex surface 76 on its lower end and is movable vertically relative to an opposed shear tool 85 having curved upwardly convex surfaces 86 and 88 on the upper end edges thereof and having a slot or relieved portion 87 formed therein into which punch 75 is moveable, against a spring loaded die anvil 89.

End surfaces 72 and 73 on the punch 75 and surfaces 82 and 83 on the die anvil 85 lie substantially in spaced vertically disposed parallel shear planes 70.

Figure 6:
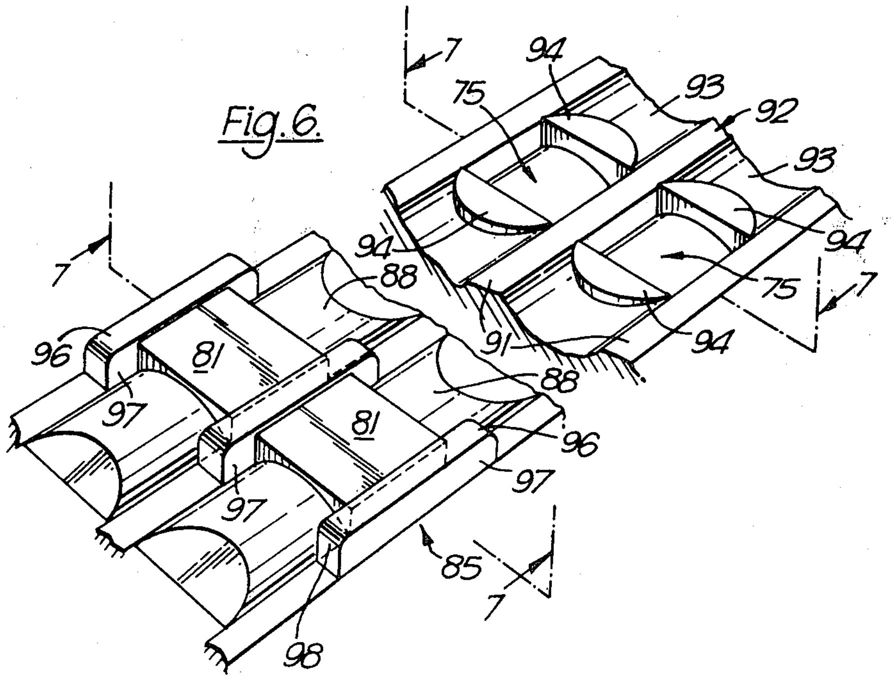
FIG. 6 shows in perspective and in greater detail the pair of shear tools, the one which is upper in use being inverted.

The upper shear tool is seen in more detail in FIG. 6. A pressure plate 92 has planar surfaces 91 extending along the whole of its length and separating adjacent apertures 90 in the plate, in which the punches 75 work. The width of the surfaces 91 is the same as the lateral width of the notchlforming cuts 14 in the strips. Longitudinal end walls of the aperture, adjacent which end faces of the punches can bear are provided by planar side surfaces of respective strongly spring loaded plungers 94. These are semi-cylindrical in shape. When projecting, they are proud of respective curved, concave, surfaces 93 formed in the plate 92 and aligned with the apertures. These surfaces 93 complement convex similar surfaces 86, 88 on the die or lower shear tool.

In this tool the die anvil 89 is spring-loaded upwardly to a limit position at which its planar surface 81 is slightly above the uppermost line of the convex surfaces 86,88. It is also flush with uppermost plane surfaces 96 of stripper fingers 97, one beyond each corner of the die aperture 87.

Stripper plungers 97 have an inclined nose surface portion 98 which extends to below the level of the uppermost line of the surfaces 86,88. Thus the upper surfaces 96 of the stripper plungers and surface 91 of the die anvil provide a support platform upon which clip material is slidable, free of the punch or die of the shear tools, nose portions 98 offering a lead-in onto that platform.

Stripper plungers 97, die anvil 89 and punch 75 are all driven in correlated movement, as will now be described with reference especially to FIG. 7.

The complete shear head 100 is driven between the jaws of a press (not shown) which act on upper 101 and lower 102 massive striker plates. The upper tool has a base plate 103 with which shear punches 75 are fast and from which they project. The base plate 103 is secured to the upper striker plate 101. The pressure plate 92 is strongly spring-loaded away from the base plate and guided for rectilinear motion by its engagement on the punches 75. Side arms 104 are secured to the base plate 103 to interact with the lower shear tool as will be described.

The lower shear tool has a base plate 105 secured to the lower striker plate. A first cross-member 106 is spring loaded away from the base plate and guided for rectilinear movement by guide posts (not shown). The cross-member bears upon it, fast with it, the die anvils 89. A second cross-member 107 bears, fast with it, the stripper plungers 97 and also edge-guides 108 which have a surface exactly level with the top surfaces of the stripper plungers.

The second cross-member 107 is spring loaded away from the first. It bears posts (not shown in the section of FIG. 7) which are slidably borne within a die body part 110 which provides the surfaces 86 and 88. The posts have heads 109. These heads can be borne on by the portions 112 of the pressure plate 92. Also on the body part 110 are guide rods 111 registering with apertures in the pressure plate 92 of the upper shear tool.

As the upper tool is progressively pressed towards the lower, the plungers 94 touch the material and then, as the planar surfaces 91 touch the material, the pressure plate 92 strikes on the heads 109 of the posts on the second cross-member. This is the position reached in FIGS. 10 and 11. Thereafter the pressure plate 92 and stripper plungers 97 and edge guides 108 move as one and due to the spring loading between the first and second cross members will also impose a minimum movement on the die anvils. In the position reached in FIGS. 12 and 13 all these parts have moved by the very slight amount (approximately 0.25 mm) that they projected above the tangential to the uppermost level of the surfaces 86,88.

Figure 14:
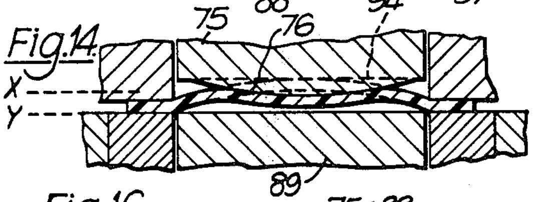
Figure 15:
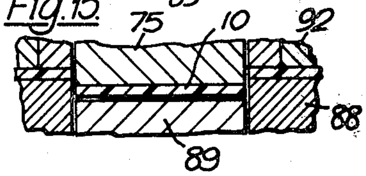
Figure 16:
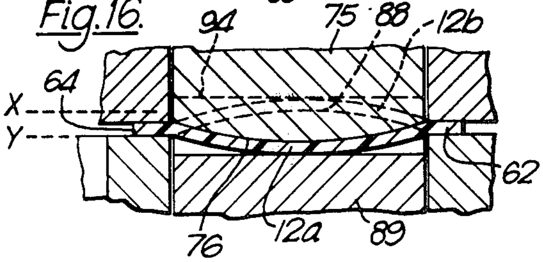
Figure 17:
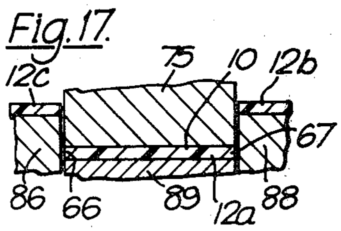

In the position rendered in FIGS. 14 and 15 the pressure plate having been prevented from further movement by its engagement with the lower shear tool, the punches 75 have started to move down through it. As this relative movement continues, the posts 104 engage the first cross-member and the anvil dies are driven downward relative to the rest of the lower shear tool: The most engaged condition of the tools is seen in FIGS. 16 and 17.

The effect of these actions of the material of the strip will now be described with reference to FIGS. 8 to 17 wherein datum lines X and Y refer respectively to the uppermost and lowermost levels of the surface 86,88.

Figure 8:
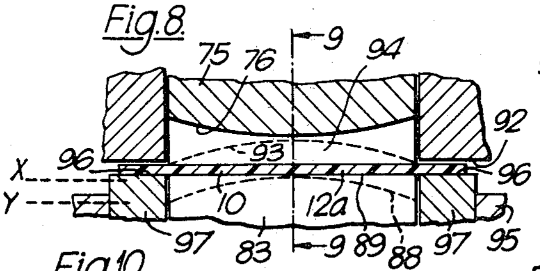
FIG. 8 is a cross-sectional view taken along line 8—8 of FIG. 5.
Figure 9:
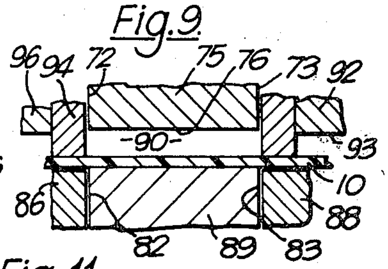
FIG. 9 is a cross-sectional view taken along line 9—9 of FIG. 8.

As diagrammatically illustrated in FIGS. 8 and 9, when a given portion of strip 10 reaches the fifth stage E in the progressive die set, the top pressure plate 92 is spaced above strip 10, strip 10 moving along the upper surface of lower pressure plate 95, at which time it is just clear of the uppermost level of the surface 88 of the die anvil. The increments of movement in the direction L are multiples of the length of each clip so that two lines 60 are sheared at one operation of the punch, the whole of the length of the clip between the lines being bowed in one direction while material of adjacent clips immediately next to the shear planes 70 is bowed in the opposite curvature.

The increments could be other even multiples of the length of the clip.

Figure 10:
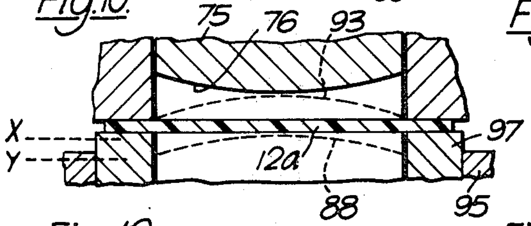
FIGS. 10 to 17 are views similar to FIGS. 8 and 9 illustrating the progressive sequence of the punch relative to the die anvil for shearing the web of frangible material in spaced shear planes.
Figure 11:
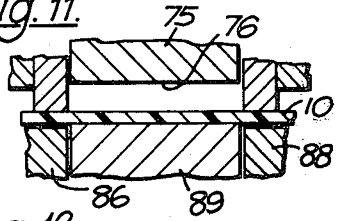

As illustrated in FIGS. 10 and 11, top pressure plate 92 is moved downwardly to engage the edges of the upper surface of strip 10 to prevent vertical motion of the strip relative to the plates, but not so tightly as to prevent lateral (horizontal) slippage of the strip between the upper and lower plates. Plungers 94 have strongly spring-loadedly engaged the material of the strip.

Figure 12:
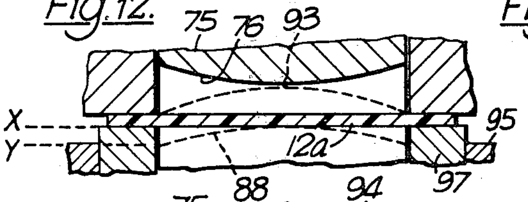
Figure 13:
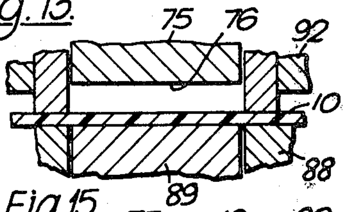

As illustrated in FIGS. 12 and 13, further downward movement of pressure plate 92 moves the strip, the stripper fingers and the die anvile relative to the lower plate 95 until the lower surface of strip 10 engages upper surfaces 86 and 88 on tool 85.

As illustrated in FIGS. 14 and 15, when the convex surface 76 on punch 75 starts to move relative to the upper and lower pressure plates, past convex surfaces 86 and 87 on tool 85, strip 10 is cut along the line 60 while the central portion of a first clip 12*a* is bowed downwardly on the convex lower end surface 76 on punch 75, that is it is bowed about an axis which is longitudinal of the strip, while central portions of spaced clips 12*b* and 12*c* adjacent opposite edges of central clip 12*a* are bowed upwardly such that the material is cut along the areas of shear planes 70 as illustrated in FIG. 5. The length to which the line 60 extends transversely across a central portion of strip 10 is dependent upon the distance surface 76 on punch 75 is moved relative to the upper surfaces 86 and 88 on die anvil 85 to cause shearing intersection of the curved surfaces of the tools.

It will be apparent that the outer edges of strip 10 must move laterally inwardly slightly as seen in plan view to compensate for the central portion of the strip being bowed around convex surfaces 76 and 86,88. However, it will be appreciated that as cut 60 is formed, edge portions 65 and 66 adjacent opposite sides of cut line 60 will move vertically see especially FIGS. 15 and 16, as a result of the shearing action adjacent surfaces 72 and 82, such that the sheared portions of strip 10 remain substantially in shear plane 70 while the shearing operation is being performed, and there is substantially no contraction of the strip in its longitudinal direction L, FIG. 3.

As the upper tool returns upwardly toward and through the position illustrated in FIG. 8, the material of strip 10 will flatten under the influence of its own resilience and under the influence of the adjacent as yet unsheared next clip area, such that upper surfaces of clips 12*a*, 12*b*, and 12*c* will lie in a common plane, clip 12*a* being connected adjacent opposite indented edges of the strip by breaking portions 62 and 64 to the adjacent clips 12*b* and 12*c*.

This is assisted by the return upwardly of the die anvil as the upper shear tool is retracted. Furthermore this retraction allows the stripper fingers 97 to rise to a level above that of the top of the surfaces 86,66 so that the material is stripped from the die and is free to be fed out of the cutting tool.

Forming the specific clip 12 illustrated in FIG. 2 in accordance with the method hereinbefore described and diagrammatically illustrated in FIGS. 8 to 16 offers several important improvements over clip construction heretofore devised. The specific geometric configuration of the bag receiving passage 22 and central aperture 20, and particularly the provision of parallel surfaces 32,34,42 and 44, and surfaces 45 and 46 to form projections 47 and 48 allows a bag neck to be moved without obstruction into aperture 20 and permits the bag neck to expand and be gripped by projections 39, 40, 47 and 48. It is very important that an unobstructed path be provided through which a bag neck is moved for compressing the neck into the opening and to permit expansion of the bag neck after the clip has been attached.

The method hereinbefore described for forming cut 60 allows connector portions 62 and 64 to be formed without stretching web 13 and strip 10 which is critical to precise positioning of one clip 12 relative to other clips 12 in a dispensing apparatus which fits clips to bag necks and which registers the clip actually being fitted by reference to the position of a clip some six or seven away along the strip. By employing the method hereinbefore described for forming line 60, the length of line 60 can be controlled and adjusted to control force required for breaking portions 62 and 64 for removing a single clip. This feature is very important in that the specific material from which the clips will be formed is rendered less critical, since the length of cut line 60 can be adjusted to control breaking force of various materials. Since no material is removed in forming cut 60 there is virtually no space between adjacent clips and a maximum number of clips can be formed from a given sheet of material since there is virtually no waste. Further, a maximum number of clips is formed from a strip of a given length thereby minimizing the size of a spool or roll of material which is used in a clip dispensing apparatus and, since the strip is planar and has little or no tendency to curl, tight and therefore economical rolls can be formed.

Figure 7:
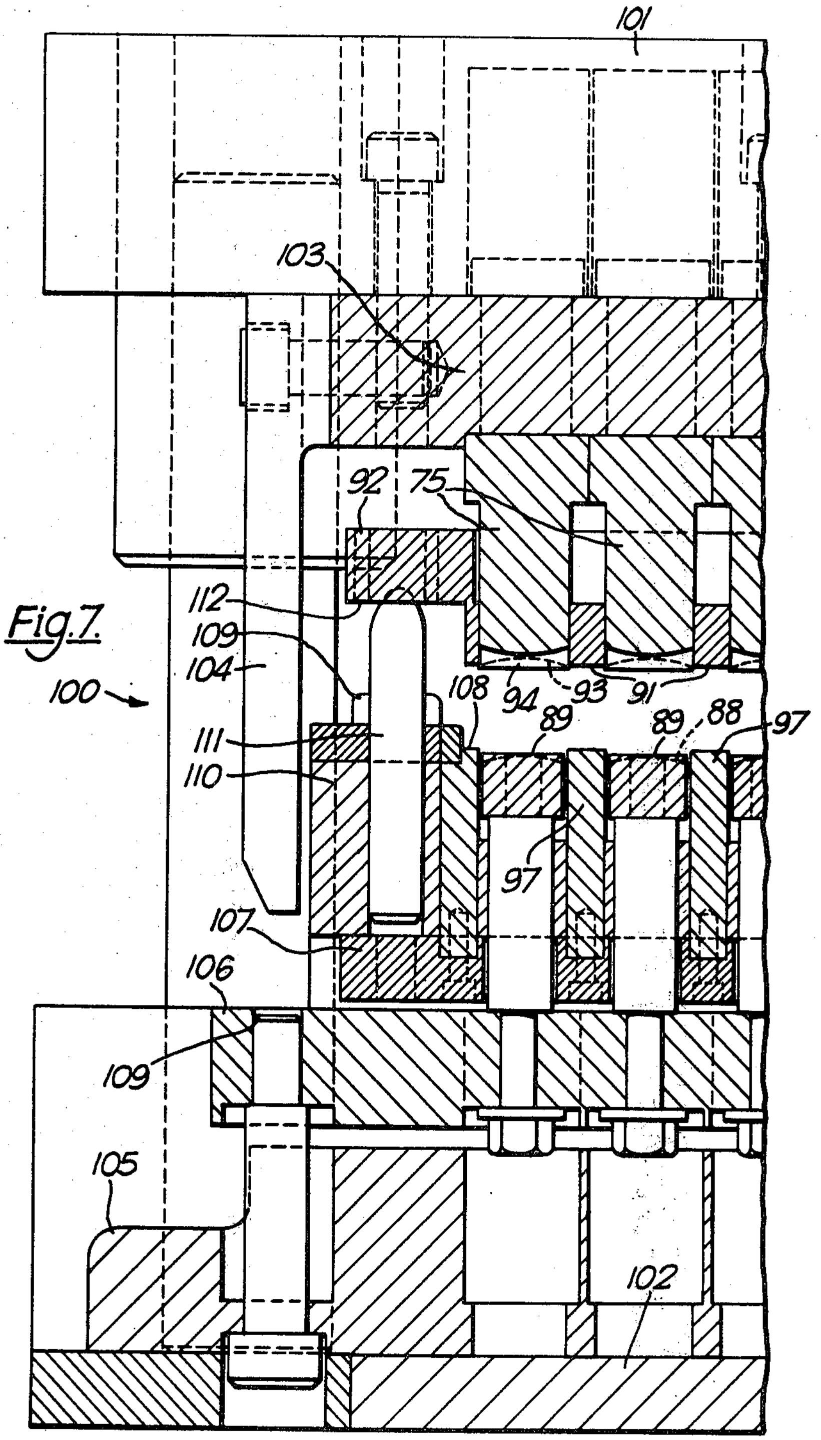
FIG. 7 is a section corresponding to the line 7—7, FIG. 6, through an assembly of such tools.

In a modification of the tool, alternate punch and die pairs in an assembly such as is seen in FIG. 7 are omitted and alternate longitudinally extending shear lines 52 are also omitted, thereby to obtain a strip of clips of the same individual width but doubled individual length, allowing more room for the attachment of price or other information.

It can be seen that we have provided a strip of frangible clips, each clip being precisely formed and precisely positioned relative to each other clip in the strip to facilitate attachment of clips to bag necks, which means that the time for performing a cycle of operation of a clip attachment apparatus can be substantially reduced. The clips also have an improved central aperture configuration to facilitate attachment of a clip to a bag neck and to detachably lock the clip to the bag neck. The method which has been described involves portions of a strip of material adjacent opposite sides of a shear plane being moved to shear the material without moving edges of the material out of the vertical shear plane such that a plane of fracture is formed and the shear plane lies in the plane of fracture and such that no residue is separated from the strip when a clip is removed from the strip.

I claim:

1. A frangible strip of clips, the strip being essentially flat and of a plastics material, in which the entrance to the aperture of each clip is at a lateral edge of the strip, each successive clip of the strip being frangibly joined to next adjacent clips by a line extending between longitudinal edges of the strip, the improvement comprising a slit which is formed through the thickness of the material of the strip by shearing the material of the strip without removal of that material, said slit terminating inwardly of said longitudinal edges of the strip to form breaking portions which are substantially longitudinally coextensive with the slit, said slit and said breaking portions lying along said line, so there are no projections between the clips which could break at undesired or multiple positions.

2. A strip according to claim 1 wherein the access to the aperture in the lateral edge of the strip is formed such that a radiused shoulder is provided between an introductory tapered portion and a narrower slot portion opening into the aperture.

3. A strip according to claim 1 wherein the line formed through the thickness of the strip terminates inwardly of apices formed at the intersection of converging surfaces formed in edges of the strip.

4. A strip according to claim 2 the aperture of each clip comprising: a semi-circular portion opposite the entrance to the aperture; a pair of curved surfaces which intersect the slot portion opening into the aperture to form barb-like projections extending into the aperture; and a pair of right angle projections extending into opposite sides of the aperture between the entrance to the aperture and the semi-circular portion of the aperture.

* * * * *